(12) United States Patent
Birk et al.

(10) Patent No.: US 8,670,551 B2
(45) Date of Patent: Mar. 11, 2014

(54) CONTACT CENTER MONITORING

(75) Inventors: Onkar Birk, Superior, CO (US); Jeff Chu, Arvada, CO (US); Barrett Davis, Erie, CO (US); Rodney A. Thomson, Westminster, CO (US); Brian J. Reynolds, Erie, CO (US)

(73) Assignee: Avaya Inc., Basking Ridge, NJ (US)

( * ) Notice: Subject to any disclaimer, the term of this patent is extended or adjusted under 35 U.S.C. 154(b) by 11 days.

(21) Appl. No.: 13/408,830

(22) Filed: Feb. 29, 2012

(65) Prior Publication Data

US 2013/0223613 A1 Aug. 29, 2013

(51) Int. Cl.
*H04M 3/00* (2006.01)

(52) U.S. Cl.
USPC .................. 379/265.03; 379/265.04; 715/700; 715/848

(58) Field of Classification Search
USPC ............. 379/265.01, 265.03, 265.06, 266.01, 379/266.04, 266.1, 265.02; 715/700, 848, 715/828
See application file for complete search history.

(56) References Cited

U.S. PATENT DOCUMENTS

| | | | |
|---|---|---|---|
| 6,633,640 B1 * | 10/2003 | Cohen et al. | |
| 6,785,649 B1 | 8/2004 | Hoory et al. | |
| 7,944,852 B2 * | 5/2011 | Wei | |
| 2005/0195964 A1 * | 9/2005 | Hahn et al. | |
| 2008/0140718 A1 * | 6/2008 | Evans et al. | 707/104.1 |
| 2009/0154685 A1 * | 6/2009 | McConnell et al. | 379/265.03 |
| 2010/0008492 A1 * | 1/2010 | Kuns et al. | |

OTHER PUBLICATIONS

Avaya Invention Disclosure, 411015.
Contact Center Globe immersive gameplay, in various forms, http://www.livestream.com/agile3d.

* cited by examiner

*Primary Examiner* — Oleg Asanbayev
(74) *Attorney, Agent, or Firm* — Sheridan Ross P.C.

(57) ABSTRACT

Methods and systems for providing a graphical depiction of a communication system incorporating multiple call centers distributed around the globe are provided. The user interface can present the graphical depiction in two or three dimensions. In addition, the user interface can provide a view of details concerning the performance of communication system components or events affecting the performance of such components, and can enable a supervisor to manipulate contact center parameters.

15 Claims, 4 Drawing Sheets

CONTACT CENTER MONITORING

FIELD

The present invention is directed to contact center monitoring. More particularly, embodiments provide an interactive depiction of geographically dispersed contact centers and a current status of those contact centers.

BACKGROUND

Contact centers, which typically are associated with human agents, are used to provide customer service and support. Increasingly, contact centers are geographically dispersed. For example, a single enterprise may have multiple contact centers at different locations across the globe. Managing such a geographically dispersed system is difficult, particularly as an administrator may be unaware of local conditions affecting performance at one contact center but not others.

Typically, a contact center is assigned to handle particular types of calls or contacts. The different calls or contacts can be sorted into queues to await service by contact center agents. In addition, different queues may be supported by different contact centers simultaneously. In order to determine the health or status of different contact centers, administrators typically have access to text based or tabular tools. Such tools can provide a snapshot of a contact center's performance. However, determining the health of a contact center from such information is not intuitive. In addition, such information may not be capable of depicting parameters that are affecting performance of a contact center that are not themselves internal to the contact center. For example, contact center performance can be affected by overloading or disruptions of communication channels linking a serviced area to the contact center. As another example, a contact center may be affected by local events, such as natural disasters or weather events. As still another example, a contact center may be presented with an exceptionally high load, and may therefore present extended caller wait times or other indications of poor performance, because another contact center is experiencing difficulties that prevent it from taking its share of contacts associated with a queue serviced by both contact centers. In these cases, it can be particularly difficult for an administrator to identify the cause of performance issues within the enterprise, and to take corrective action.

SUMMARY

Systems and methods that provide an interactive depiction of geographically dispersed contact centers and a current status of those contact centers are provided. More particularly, a geographic view of contact centers within a communication system is presented, together with an indication of the health of the individual contact centers. In addition, the depiction can include additional information. For example, a health or status of communication links between contact centers and/or service areas can be provided. As a further example, newsfeeds or other information related to a location of a contact center, service area, or communication link can be provided.

In accordance with at least some embodiments of the present disclosure, additional information related to contact centers, service areas, communication links or news related to particular locales can be accessed. Moreover, such access can be facilitated by the user interface that presents the communication system information. For example, intuitive gestures can be used to select items for which additional information is desired, and to initiate the display of such additional information. In accordance with further embodiments, a user can enter commands related to displayed information through the user interface. Moreover, in accordance with at least some embodiments, the user interface can present a three-dimensional depiction of a map or globe and components of a communication system.

The methods disclosed herein can include monitoring at least a first performance parameter associated with first and second contact centers. The at least a first performance parameter is used to assign a performance score to the first contact center. A geographic location of the first contact center is represented in a display output. In addition, the assigned performance score of the first contact center is represented in the display output. Moreover, a geographic location of the second contact center is also represented in the display output.

The method can additionally include, using at least a first performance parameter, assigning a performance score to the second contact center, and representing the assigned performance score of the second contact center in the display output. The first performance parameter can include a health parameter. The health parameter can further include a health of agents associated with the respective site or contact center. The health of agents associated with the respective site can be derived from information including a time for the agents associated with the first site to handle contacts in a first queue compared to a time for the agents associated with the second site to handle contacts in the first queue. In addition, a status of a communication link between the first contact center in at least one of the second contact in a geographic region other than the geographic region included in the first contact center can be represented in the display output. Moreover, the status of the communication link can include a representation of a volume of contacts carried by that link. In accordance with further embodiments, a newsfeed associated with the geographic location of the first contact center is received, and information from the newsfeed is displayed in the display output. User input can be received selecting the first contact center, in response to the user input additional information regarding that contact center can be displayed. The additional information can include the health of agents associated with the first contact center, the health of at least a first queue associated with the first contact center, or information included in the newsfeed associated with the geographic location of the first contact center. The method can additionally include representing the status of a communication link between contact centers or a contact center and a geographic region, receiving a newsfeed associated with the location of the second contact center, and displaying information from the newsfeed associated with the geographic location of the second contact center in the display output, wherein the status of the assigned performance scores of the contact centers, the status of the communication link between the contact centers and/or a geographic region other than the geographic region including the contact center, and information from the newsfeeds are all displayed simultaneously in the display output. The display output can be a three-dimensional display output. Moreover, the display output can be presented by a touch screen display.

Embodiments can further include a computer readable medium having stored thereon computer executable instructions, the instructions causing a processor to execute a method for facilitating mobile monitoring and control of a communication system that includes at least a first contact center. The instructions include instructions to provide a presentation of a geographic area, instructions to represent data of a first type related to the first contact center in a first portion of the geographic area corresponding to a location of a first contact center, and instructions to represent data of the first type related to a second contact center in a second portion of the geographic area corresponding to a location of the second contact center. The computer readable medium can be included in a supervisor device, and the instructions can be executed by a processor included in that device. The computer readable medium can additionally include instructions to represent data of a second type related to at least one of a communication link to at least one of the first and second contact centers in a service area associated with at least one of the first and second contact centers. In addition, the computer readable medium can include instructions to present information of the third type in response to user input selecting one of the first and second contact centers.

Other embodiments comprise a device having a communication interface, a user output, a user input, a processor, and memory. The memory can have stored thereon first call center data, second call center data, and a monitor and control application. The monitor and control application is executed by the processor and displays call center related information to a user. The call center related information is presented graphically by the user output, and the call center related information associated with the first call center is displayed in a geographic location corresponding to an actual location of that call center. Moreover, the call center related information associated with the second call center is displayed in the geographic location corresponding to an actual location of that call center. The device can also include a communication application stored in memory that supports communications between the device and one of the call centers in response to a selection of a displayed depiction of the call centers. The monitor and control application can further display information related to the status of a communication link between call centers or a call center and service area, conditions in a geographic location, and a status of a service area.

Additional features and advantages of embodiments of the present invention will become more readily apparent from the following description, particularly when taken together with the accompanying drawings.

DETAILED DESCRIPTION

Figure 1:
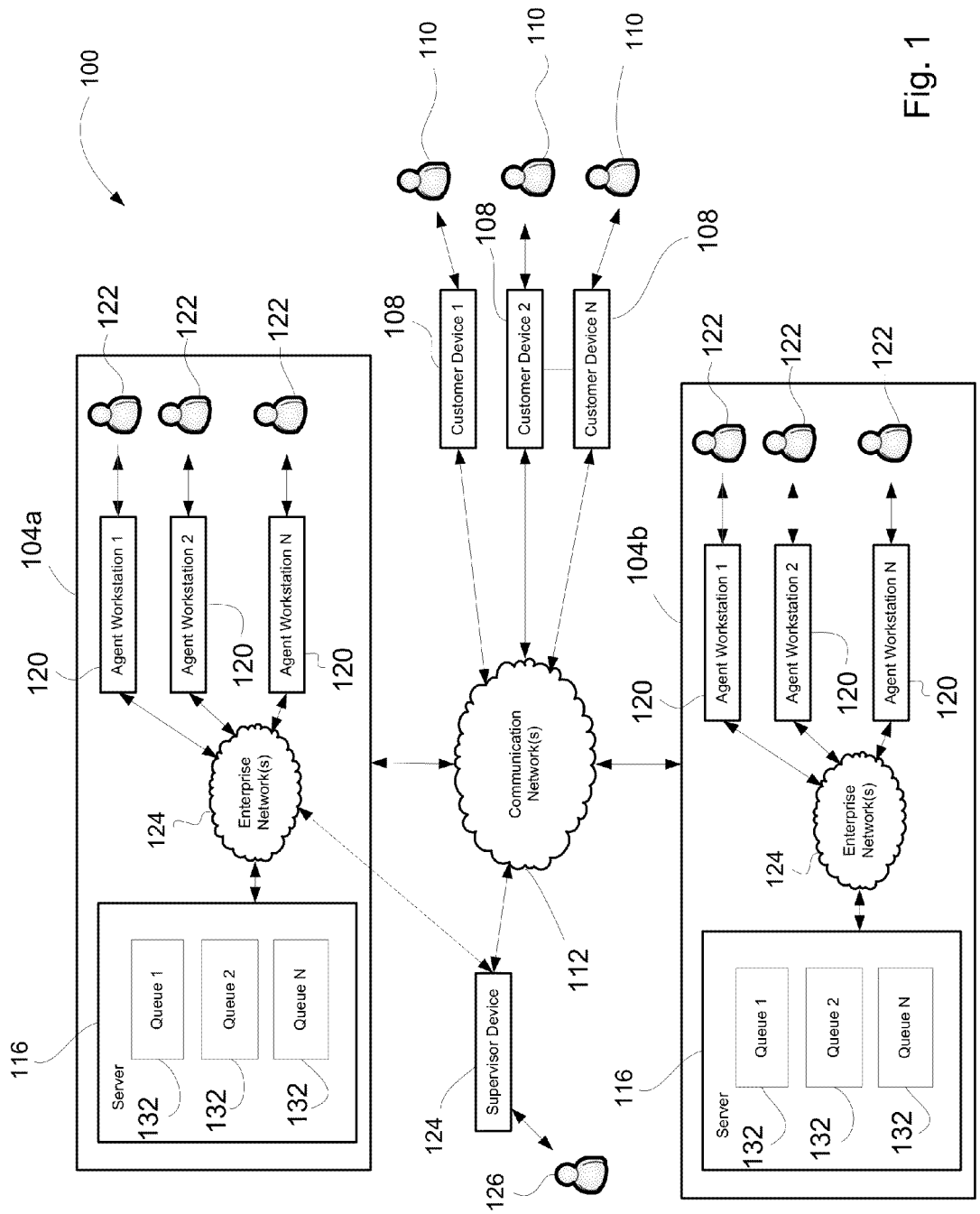
FIG. 1 is a block diagram depicting components of a system in accordance with embodiments of the present invention.

FIG. 1 is a block diagram depicting components of a communication system 100 in accordance with embodiments of the present invention. In particular, the communication system 100 includes a plurality of call or contact centers 104. Although a first 104a and a second 104b contact center are shown, a communication system 100 can have any number of contact centers 104. In addition, each contact center 104 can be at a different geographic location than some or all of the other contact centers 104. In general, the contact center 104 can be in communication with one or more customer endpoints or devices 108 via one or more communication networks 112. Examples of customer endpoints 108 include but are not limited to telephones, cellular telephones, and desktop or mobile computing devices, or any other device capable of supporting communications between a customer and a customer service or other agent associated with the contact center 104. Moreover, the communications between the contact center 104 and the customer endpoints 108 can comprise voice telephony, video telephony, email, instant messaging, short message system, or other real time or non-real time communications. The communication network 112 can include the Internet, local area network, wide area network, public switched telephony network (PSTN), wireless networks, or a plurality of networks in any combination. The contact center 104 generally includes a call or contact center server 116, such as an automatic contact (or call) distribution system (ACD) server 116. The ACD server 116 is illustratively the MultiVantage™ enterprise communication-based ACD system available from Avaya Inc. The ACD server 116 is interconnected to a plurality of agent workstations or endpoints 120. The agent workstations 120 may be connected to the ACD server 116 by a voice and/or data transmission median or enterprise network 128.

The ACD server 116 generally functions to connect agent workstations 120 to customer devices or endpoints 108 through the communication network 112, to place customers 110 in communication with agents 122. In addition, the ACD server 116 maintains queues 132 for servicing customer contacts. The different queues 132 can be used to sort contacts from (or to) customer endpoints 108 by type, identity of the customer or contact 110, or any other attribute. Agents 122 associated with the agent workstations 120 are assigned to provide services to contacts that have been placed within one or more of the queues 132 based on availability and/or weighting factors.

In addition, embodiments of a communication system 100 can include a supervisor or administrator device 124. The supervisor device 124 is in communication with the ACD server 116 via the communication network 112 and/or the enterprise network 128. For example, if the supervisor device 124 is on the premises of the contact center 104, communications with the ACD server 116 may be over a portion of the enterprise network 128 comprising a wireless (e.g., a Wi-Fi) network. As another example, the supervisor device 124 may be in communication with the ACD server 116 over the communication network 112, for example via a cellular telephony data network, a Wi-Fi or wired Ethernet connection outside of the enterprise network 128. In general, the supervisor device 124 provides functionality that allows a supervisor 126 to monitor the health of the contact center 104, and to control aspects of the operation of the contact center 104.

The supervisor device 124 can comprise any device, including a mobile device, capable of presenting information to a supervisor 126, and of receiving control commands from the supervisor 126. In addition, the supervisor mobile device 124 is generally a device capable of running an application that provides a browser, template or framework for displaying information and receiving input with respect to such information. In addition, the supervisor mobile device 124 is a device that is capable of wireless communications over at least one of a variety of wireless network types, including but not limited to cellular data networks (such as 3G or 4G networks), Wi-Fi networks, WiMax networks, Bluetooth connections, and the like. Accordingly, a supervisor device 124 can include, but is not limited to, a tablet computer, a laptop computer, a Smartphone, a Netbook, a desktop computer, or the like.

Figure 2A:
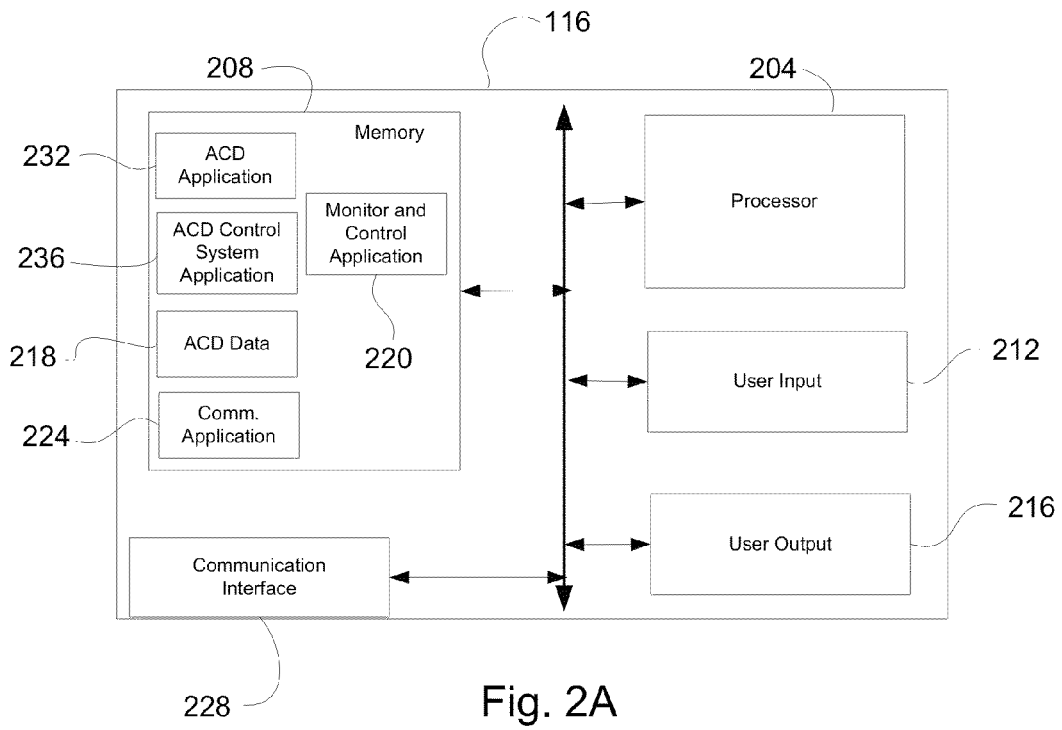
FIGS. 2A-2B are block diagrams of a contact center server and a supervisor device respectively in accordance with embodiments of the present invention.
Figure 2B:
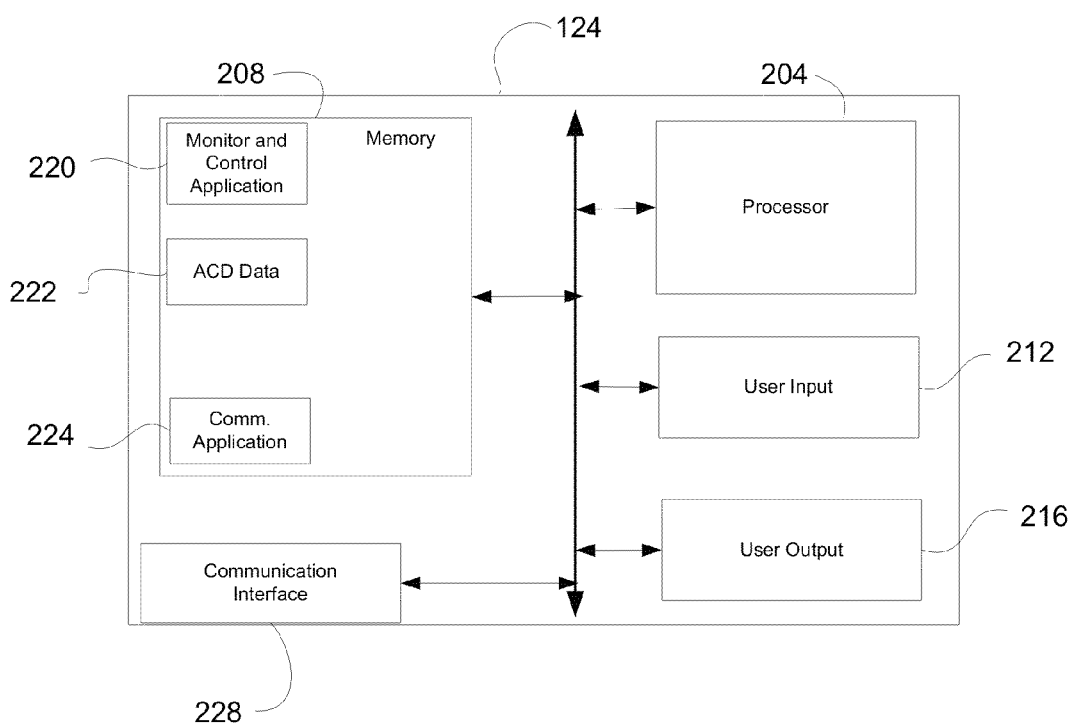

FIGS. 2A-2B are block diagrams depicting components of an ACD system 104 in accordance with embodiments of the present invention. More particularly, components of an ACD server 116 are shown in FIG. 2A, while components of a supervisor device 124 are shown in FIG. 2B.

As the ACD server 116 and the supervisor device 124 can, at least partially, be implemented as conventional computing devices, they share certain components in common. For example, each generally includes a processor 204 capable of executing program instructions. The processor 204 may include any general purpose programmable processor or controller for executing application programming. Alternatively, the processor 204 may comprise a specially configured application specific integrated circuit (ASIC). The processor 204 generally functions to run programming code implementing various functions performed by the associated ACD server 116 or supervisor device 124. For example, with respect to the ACD server 116 (see FIG. 2A), the processor 204 can implement functions including assigning incoming contacts received by the contact center 104 from customer endpoints 108 to contact queues 132 and to agent workstations 120 for handling by associated agents 122. As another example, with respect to the supervisor device 124 (see FIG. 2B), such functions may include displaying information regarding the operation of the communication system 100 and/or an included call center 104 to the supervisor 126, and to receiving commands input by the supervisor 126 with respect to the operation of a contact center 104. Moreover, as described in greater detail elsewhere herein, the ACD server 116 and the supervisor device 124 operate in cooperation with one another to provide monitoring and control functions to a supervisor 126, to assist in the operation of the contact center 104.

The ACD server 116 and the supervisor device 124 additionally include memory 208. The memory 208 can be used in connection with the execution of programming by the processor 204 of the associated device 116 or 124, and for the temporary or long term storage of data or program instructions. For example, the ACD server 116, as shown in FIG. 2A, can include a monitor and control application 220 and/or an automatic call distribution application 232 that is stored in memory 208. As an additional example, the ACD server 116 can operate in connection with the operation of an ACD control system application 236 stored in the memory 208 that functions as an adjunct to or in cooperation with the ACD call distribution application 232. The memory 208 of the ACD server 116 can also function as a store for records or other data 218 that is related to the ACD or contact queues 132 maintained by the ACD server 116. The memory 208 included in the supervisor device 124, as shown in FIG. 2B, can include a monitor and control application 220. As described in greater detail elsewhere herein, the monitor and control application 220, whether implemented on one or both of an ACD sewer 116 or a supervisor device 124, can provide a user interface to display information regarding the operation of the ACD system 104 to the supervisor 126 or other user, and to receive control input from the supervisor 126 or other user. The memory 208 in the supervisor device 124 can also provide storage for ACD system 104 data 222. The memory 208 of the ACD server 116 and/or the supervisor mobile device 124 can additionally provide storage for one or more communication applications 224. Examples of communication applications 224 include, but are not limited to, email, instant messaging, voice telephony, video telephony, and the like. The memory 208 of the ACD server 116 and/or the supervisor mobile device 124 can include solid state memory that is resident, removable and/or remote in nature, such as DRAM and SDRAM. Alternatively or in addition, the memory 208 can include magnetic, optical or other storage devices. Moreover, the memory can include a plurality of discrete components of different types and/or a plurality of logical partitions.

In addition, user input devices 212 and user output devices 216 may be provided. With respect to the ACD server 116, such devices 212 and 216 can be used in connection with the monitoring and control of the ACD system 104 by a supervisor 126 or an administrator in a conventional fashion, in which the supervisor 126 or administrator is tethered to the contact center 104. With respect to the supervisor device 124, the one or more user input devices 212 or one or more user output devices 216 facilitate the remote monitoring and control of the ACD system 104 by the supervisor 126 through the supervisor device 124. Examples of user input devices 212 include a keyboard, a numeric keypad, touch screen, microphone, scanner, and pointing device combined with a screen or other position encoder. Examples of user output devices 216 include a display, a touch screen display, a speaker, and a printer. The ACD server 116 and the supervisor mobile device 126 also generally include a communication interface 228 to interconnect the server 116 or device 126 to the networks 112 and 128.

Figure 3:
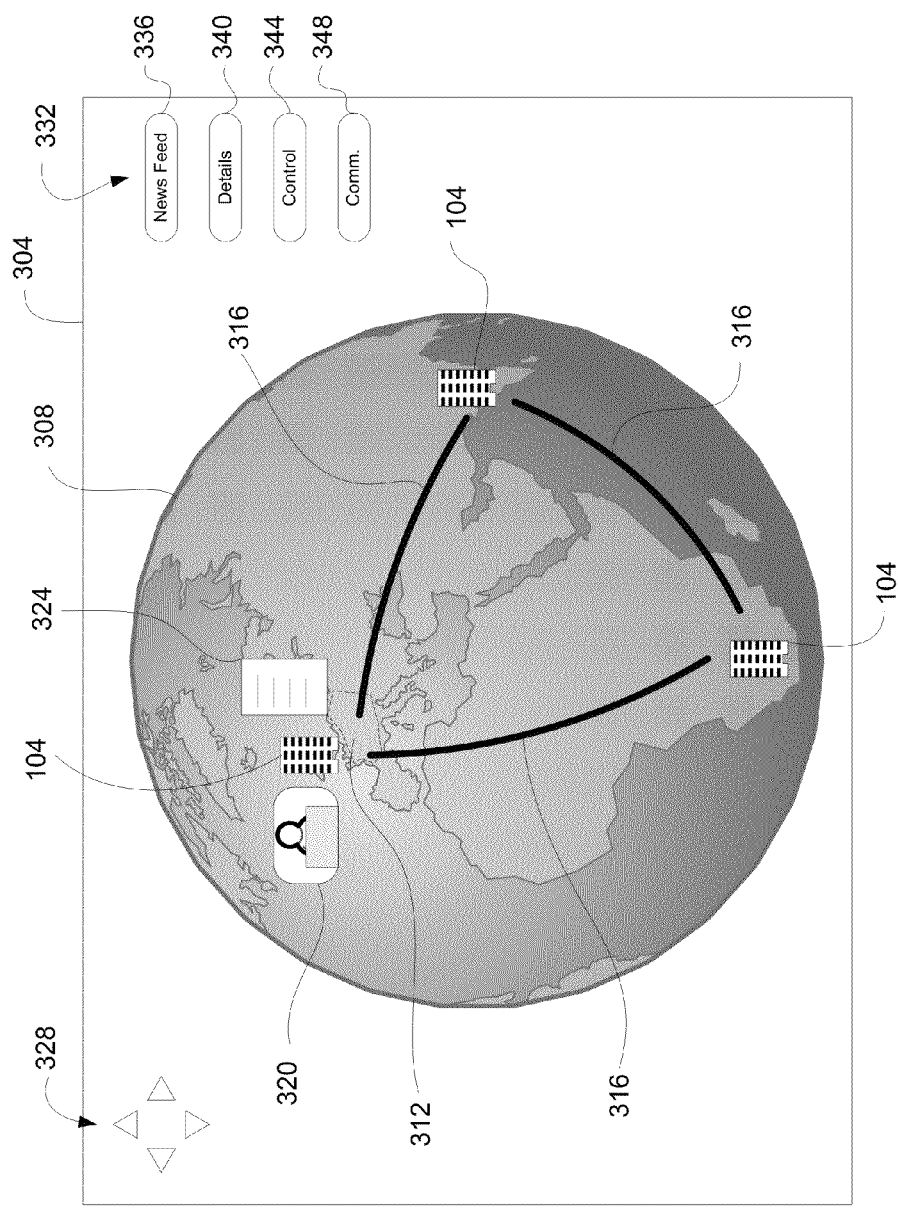
FIG. 3 depicts a user interface in accordance with embodiments of the present invention.

FIG. 3 depicts a user interface 304 in accordance with embodiments of the present invention. The user interface 304 can be generated through operation of the ACD call distribution application 232 on one or a plurality of contact center servers 116 within the communication system 100, and/or in connection with a monitor and control application 220 running on an ACD server 116 and on a supervisor device 124. The user interface 304 can be presented by a user output 216 of a contact center server 116 and/or a supervisor device 124. Moreover, the user interface 304 can be interactive, in that it can provide fields, regions, buttons, menus, or other features to enable the user interface to receive input from a supervisor or administrator 126, as well as to present information to the supervisor 126 graphically.

The user interface 304 can present a map 308 encompassing a geographic area and showing the geographical relationship or separation between different contact centers 104 within a communication system 100. In accordance with at least some embodiments, a user interface 304 can present the information in two dimensions. In accordance with further embodiments, a user interface 304 can present the information in three dimensions. Accordingly, the user output 216 used to present the information can include a three-dimensional output that, for example, requires the supervisor 126 to position their eyes at a particular location or area when viewing the output 216, in order to receive the three-dimensional information, to wear specially configured glasses with electronic shutters or polarization features required to receive a three-dimensional image, or the like. As yet a further example, by manipulating the image, for example through using touch and drag gestures entered on a user output 212, 216 comprising a touch screen, the supervisor 126 can rotate a depiction of the globe presenting the geographically dispersed contact centers 104, to view other areas of the globe (i.e., the Earth) displayed as the map 308, and the status of contact centers 104 and/or serviced regions 312 therein.

The health or status of the different contact centers 104, as determined from a scoring procedure implemented by, for example an ACD control system application 236 and/or a monitor and control application 220, can be communicated to the supervisor 126 through the color associated with the different contact centers 104. For example, a contact center 104 in poor health (for example one that is not meeting minimum service requirements) may be shown in red, a contact center 104 that is not meeting optimum service goals can be shown in orange, and a contact center that is meeting all service goals can be shown in green. Similarly, the status of communication links or channels 316 between contact centers 104 and/or between contact centers 104 and serviced areas 312 can be depicted through the use of color or some other indication. Additionally, depicted information can include information 320 related to the location or region including a contact center 104, a serviced area 312, and/or a communication link 316. Such information 320 can be obtained from a news feed, such as a Really Simple Syndication (RSS) feed, a broadcast news feed, a twitter account, or the like. As yet another example, detailed information 324 regarding one or more contact centers 104 can be displayed. The detailed contact center information 324 can include information regarding various monitored performance parameters associated with one or more contact centers 104. Moreover, the supervisor 126 or other user can provide control input through or in connection with the detailed contact center information 324, to control aspects of the operation of the contact center 104.

In accordance with embodiments of the present invention, the user interface 304 allows a user such as a supervisor 126 to interact with and manipulate contact centers 104 in an immersive, game like experience. For example, by placing a finger on the displayed map or globe 308, and dragging it across the screen of the output device 216, the portion of the map 308 visible to the supervisor 126 can be changed. That is, the globe or map 308 can be rotated to reveal areas or regions of interest. Moreover, prominence can be given to a contact center or centers 104 appearing in the middle of the user interface 304 display. For example, by centering a contact center 104 within the display, more detailed information about that contact center 104 can be revealed, as compared to other contact centers 104. For instance, the centered contact center may present information 324 regarding the performance of that contact center 104 and/or its associated agents 122 in a tabular or textual form, in an area of the display proximate to the depiction of the contact center 104 location on the globe. Alternatively or in addition, information concerning news that might affect the performance of the selected contact center 104 can be presented in a window 320. For instance, weather reports, information regarding the political climate, social unrest, or other information can be depicted. As a particular example, a window providing a feed from local news and/or weather can be presented. Where an audio component of such a feed is available, a supervisor 126 can listen to such audio output through a user output 216 comprising an audio output device by tapping the depiction of the news feed or otherwise selecting it.

In accordance with still other embodiments, a user can effectively "scroll" through items of information related to a call center 104 by repeatedly tapping the call center 104, with each tap bringing up the different category or item of information. In addition to accessing detailed information about a call center 104, a supervisor 126 can control aspects of the operation of the contact center 104. For example, the supervisor 126 can manipulate parameters associated with queues 132 established in connection with or serviced by the contact center 104, can manipulate the assignments of human agents 122 with respect to different queues 132, etc. Moreover, in connection with user interface 304 in accordance with embodiments of the present invention, such actions can be taken with respect to different contact centers 104 through manipulating the view of the contact centers 104 presented by the user interface 304. For example, a supervisor 126 or other user can center a desired contact center 104 in the user interface 304 using a drag gesture, can drill down to access detailed information about the selected contact center 104 using a tap gesture, and can enter changes to parameters associated with a selected contact center 104 through input provided using the user interface 304.

In addition to input provided as gestures entered in connection with a touch screen display of the map 308, the user interface can present and/or operate in connection with software or hardware buttons. For example, control buttons 328 can be provided for changing the displayed area of the map 308. As another example, radio buttons 332 can be provided for performing various functions, such as activating a news feed 336, accessing detailed contact center information 340, or controlling contact center parameters 344 with respect to a selected contact center 104.

Embodiments of the present invention additionally allow a supervisor 126 to initiate communications with personnel, such as agents 122, associated with a contact center 104 by interacting with the user interface 304. For instance, by using a long tap gesture, or other assigned gesture input, a supervisor 126 interacting with the user interface 304 can initiate a communication, such as a voice or video call, email, short message system, or other communication, with the contact center 104. For example, by using a long tap gesture input in an area of the user interface 304 corresponding to a contact center 104 that the supervisor 126 desires contact with, a voice or video call, chat, text message, or email message between the supervisor and an agent 122 or other person associated with the contact center 104 can be initiated, for example via the supervisor workstation 124. A software or radio button 332 can also be provided to initiate communications 348 with a selected contact center 104.

Figure 4:
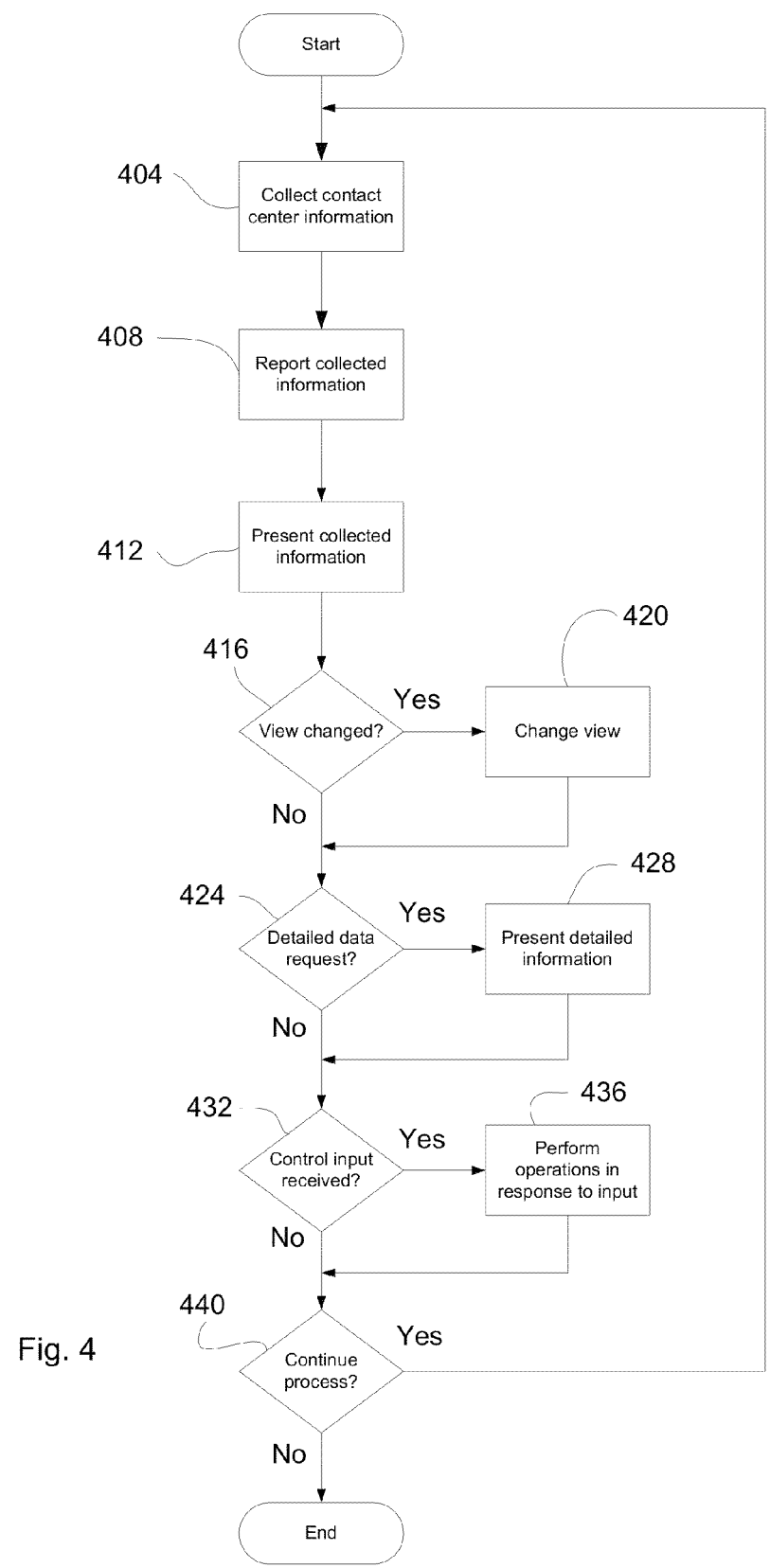
FIG. 4 is a flowchart depicting aspects of a method in accordance with embodiments of the present invention.

With reference now to FIG. 4, aspects of a method for presenting contact center 104 information to a supervisor 126 in a communication system 100 in accordance with embodiments of the present invention are depicted. Initially, the ACD application 232 running on contact center servers 116 associated with different contact centers 104 may operate to collect contact center 104 information (step 404). The collected information can be reported to one or more other contact center servers 116, and/or to a supervisor device 124 (step 408). At step 412, the collected information or information derived therefrom, such as a performance parameter score, is presented, at least in part, by a user interface 304, through operation of the ACD control system application 236 on a contact center server 116 and/or the monitor and control application 220 executed by the supervisor device 124. More particularly, the user interface 304 generated by the ACD control system application 236 and/or the monitor and control application 220 presents a view of the map or globe 308 through the user interface 304. The initial view can be a default view, or the view that was last presented to the supervisor 126 during an earlier session. The view can present performance parameter information, such as a performance parameter score associated with one or more contact centers 104, communication links 316, or other communication system 100 components simultaneously. Moreover, the score may be communicated by an assigned color, numeric score, letter grade, or other indicia.

At step 416, a determination can be made as to whether input has been received changing the view. If such input has been received, for example in the form of a drag gesture entered on a touch screen display 212, 216 presenting the user interface 304, the view of the globe 308 can be changed accordingly (step 420). For instance, a drag gesture can result in rotating the globe 308 to present a different portion of the Earth or the depicted area. Accordingly, a supervisor or other user 126 can choose to view different contact centers 104 in different areas of the world.

After changing the view of the globe 308 in response to received user input, or if no such input is received, a determination can be made as to whether the supervisor 126 or other user has provided input indicating a desire to access detailed call center 104 or related data (step 424). If such input has been received, the user interface 304 can be modified to present the detailed information requested by the supervisor 126 (step 428). At step 432, a determination can be made as to whether the supervisor 126 has entered control input with respect to the detailed data. This control input can include input to adjust parameters associated with a selected call center 104, such as parameters relating to queues 132 or agents 122 presented as part of detailed contact center information 324. As further examples, a supervisor 126 can modify parameters associated with multiple contact centers 104. For example, responsibility for a queue 132 can be transferred between different contact centers 104 within the communication system 100, for example by dragging representations of queues from a first contact center 104a to a second contact center 104b. If control input is received, additional operations indicated by the input can be performance (step 436). After performing additional operations in response to the control input, or after determining that no such input has been received, a determination can next be made as to whether operation of the ACD monitor and control application 220 and/or the ACD control system application 236 is to continue (step 440). If operation is to continue, the process can return to step 404. Accordingly, the data presented through any of the selected windows or fields available through the user interface 304 can be continuously or periodically updated. Alternatively, the process can end.

In accordance with embodiments of the present invention, a supervisor 126 can immediately access information regarding the operation of a communication system 100. More particularly, the supervisor 126 is presented with a map 308 view of communication system 100 components, including contact centers 104 and communication links 316 and serviced areas 312. In addition, the user interface 304 provides a convenient mechanism by which the supervisor 126 or other user can access detailed information regarding the communication system 100 components, and to manipulate parameters associated with the operation of the communication system 100 components. Moreover, embodiments of the present invention provide a user interface 304 that presents a globe 308 and communication system 100 components in three-dimensions, to facilitate viewing of and interaction with those components by the supervisor 126. Accordingly, a graphic depiction of a communication system 100 conditions can be presented.

In accordance with further embodiments of the disclosed invention, the user interface 304 can present detailed information 320 regarding conditions affecting or potentially affecting the performance of contact center 100 components. Examples include the presentation of news feeds, such as broadcast news or RSS feeds, regarding the weather, political situation, social situation, or other information. Accordingly, such information is made available to a supervisor 126 in connection with determining how to address performance issues affecting or potentially affecting the communication system 100. Like other types of information presented by the user interface 304, news or other information about an area encompassing a contact center 104, a serviced area 108, or a communication link 316, can be presented and selected. For instance, a video only depiction of news can be presented in connection with a selected contact center 104, serviced area 312, or communication link 316, while audio information can be added by selecting the news feed 320.

Although particular examples of information that can be depicted and selected have been provided, other combinations and functions are possible. In general, such combinations and functions are made possible by unique geographic and graphical presentation of communication system 100 information in connection with the user interface 304 implemented through operation of the ACD control system application 236 and/or monitoring control application 220. In addition, although interactivity with the user interface 304 have been discussed in connection with a supervisor 126, it should be appreciated that any authority or user can interact with the user interface 304, and benefit therefrom. Moreover, although in at least some embodiments the monitor and control application 220 and the ACD control system application 236 on one contact center 104 operate as a primary module or mode in connection with the collection, storage, sorting, and presentation of such information through a user interface 304 to a supervisor 126 or other user, other arrangements are possible. For instance, a primary ACD control system application 236 on a contact center 104 can provide information collected from contact centers 104 and other communication system 100 components to a monitor and control application 220 executed by a supervisor device 124. As another example, the ACD control system applications 236 on different ACD servers 116 can provide information regarding the contact center or centers 104 with which they are associated, and connected service areas 308 in communication links 316 to the monitor and control application 220 on the supervisor device 124, in which case the monitor and control application 220 can perform collection and arrangement functions with respect to such data. In accordance with still other embodiments, a supervisor or other user 126 can interact with an ACD server 116 directly, rather than through a supervisor device 124.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method, comprising:
monitoring at least a first performance parameter associated with first and second contact centers, wherein the first performance parameter includes a health parameter, wherein the health parameter includes a health of agents associated with a respective contact center;
based on at least the first performance parameter, assigning a performance score to the first contact center;
representing a geographic location of the first contact center on a map encompassing a geographic area presented in a display output;
representing the assigned performance score of the first contact center on the map in the display output;

representing a geographic location of the second contact center on the map encompassing the geographic area presented in the display output;

based on at least the first performance parameter, assigning a performance score to the second contact center;

representing the assigned performance score of the second contact center in the display output;

representing a status of a first communication link between the first contact center and at least one of the second contact center and a second geographic region other than a first geographic region including the first contact center on the map encompassing the geographic area presented in the display output;

receiving a broadcast news feed associated with the geographic location of the first contact center;

displaying information from the broadcast news feed associated with the geographic location of the first contact center in the display output while representing the geographic location of the first contact center, the geographic location of the second contact center, and the status of the first communication link represented on the map encompassing the geographic area presented in the display;

representing a status of a second communication link between the second contact center and at least one of the first contact center and a third geographic region other than a fourth geographic region including the second contact center in the display output;

receiving a news feed associated with the geographic location of the second contact center; and displaying information from the news feed associated with the geographic location of the second contact center in the display output, wherein the status of the assigned performance scores of the first and second contact centers, the status of the first communication link between the first contact center and at least one of the second contact center and the second geographic region other than the first geographic region including the first contact center, information from the broadcast news feed associated with the geographic location of the first contact center, the status of the second communication link between the second contact center and at least one of the first contact center and the third geographic region other than the fourth geographic region including the second contact center, and the information included in the news feed associated with the geographic location of the second contact center are all displayed simultaneously in the display output.

2. The method of claim 1, wherein the health of agents associated with the respective contact centers is derived from information including a time for the agents associated with the first contact centers to handle contacts in a first queue compared to a time for the agents associated with the second contact centers to handle contacts in the first queue.

3. The method of claim 1, wherein the status of the first communication link represented on the map encompassing the geographic area presented in the display output includes a representation of a volume of contacts carried by the first communication link.

4. The method of claim 1, further comprising:

receiving user input selecting the first contact center;

in response to the user input selecting the first contact center, displaying additional information regarding the status of the first contact center.

5. The method of claim 4, wherein the additional information regarding the status of the first contact center includes additional information regarding at least one of:

the health of the agents associated with the first contact center;

the health of at least a first queue associated with the first contact center;

information included in the broadcast news feed associated with the geographic location of the first contact center.

6. A method, comprising:

monitoring at least a first performance parameter associated with first and second contact centers;

based on at least the first performance parameter, assigning a performance score to the first contact center;

representing a geographic location of the first contact center on a map encompassing a geographic area presented in a display output;

representing the assigned performance score of the first contact center in the display output;

representing a geographic location of the second contact center on the map encompassing the geographic area presented in the display output;

based on at least the first performance parameter, assigning a performance score to the second contact center;

representing the assigned performance score of the second contact center in the display output, wherein the first performance parameter includes a health parameter, wherein the health parameter includes a health of agents associated with the respective contact center, wherein the health of agents associated with the respective contact center is derived from information including a time for the agents associated with the first contact center to handle contacts in a first queue compared to a time for the agents associated with the second contact center to handle contacts in the first queue;

representing a status of a first communication link between the first contact center and at least one of the second contact center and a second geographic region other than a first geographic region including the first contact center on the map encompassing the geographic area presented in the display output;

receiving a broadcast news feed associated with the geographic location of the first contact center;

displaying information from the broadcast news feed associated with the geographic location of the first contact center in the display output while representing the geographic location of the first contact center, the geographic location of the second contact center, and the status of the first communication link represented on the map encompassing the geographic area presented in the display output;

representing a status of a second communication link between the second contact center and at least one of the first contact center and a third geographic region other than a fourth geographic region including the second contact center in the display output;

receiving a news feed associated with the geographic location of the second contact center;

displaying information from the news feed associated with the geographic location of the second contact center in the display output, wherein the status of the assigned performance scores of the first and second contact centers, the status of the first communication link between the first contact center and at least one of the second contact center and the second geographic region other than the first geographic region including the first contact center, information from the broadcast news feed associated with the geographic location of the first contact center, the status of the second communication link between the second contact center and at least one of the first contact center and the third geographic region other than the fourth geographic region including the second contact center, and the information included in the news feed associated with the geographic location of the second contact center are all displayed simultaneously in the display output.

7. The method of claim 6, wherein the display output is a three-dimensional display output.

8. The method of claim 7, wherein the display output is presented by a touch screen display.

9. A non-transitory computer readable medium having stored thereon computer executable instructions, the computer executable instructions causing a processor to execute a method for facilitating mobile monitoring and control of a communication system that includes at least a first contact center, the computer readable instructions comprising:
  instructions to provide a presentation of a geographic area on a display;
  instructions to represent data of a first type related to the first contact center in a first portion of the geographic area corresponding to a geographic location of the first contact center;
  instructions to represent data of the first type related to a second contact center in a second portion of the geographic area corresponding to a geographic location of the second contact center;
  instructions to represent a status of a first communication link between the first contact center and at least one of the second contact center and a second geographic region other than the first geographic region including the first contact center on the map encompassing the geographic area presented in the display;
  instructions to receive a broadcast news feed associated with the geographic location of the first contact center;
  instructions to display information from the broadcast news feed associated with the geographic location of the first contact center in the display output while representing the geographic location of the first contact center, the geographic location of the second contact center, and the status of the first communication link on the map encompassing the geographic area presented in the display;
  instructions to represent a status of a second communication link between the second contact center and at least one of the first contact center and a third geographic region other than the fourth geographic region including the second contact center on the map encompassing the geographic area presented in the display;
  receiving a news feed associated with the geographic location of the second contact center; and
  instructions to display information from the news feed associated with the geographic location of the second contact center in the display,
    wherein the status of the assigned performance scores of the first and second contact centers, the status of the first communication link between the first contact center and at least one of the second contact center and the second geographic region other than the first geographic region including the first contact center, information from the broadcast news feed associated with the geographic location of the first contact center, the status of the second communication link between the second contact center and at least one of the first contact center and the third geographic region other than the fourth geographic region including the second contact center, and the information included in the news feed associated with the geographic location of the second contact center are all displayed simultaneously in the display.

10. The non-transitory computer readable medium of claim 9, wherein the non-transitory computer readable medium is included in a supervisor device, and wherein the instructions are executed by a processor included in the supervisor device.

11. The non-transitory computer readable medium of claim 10, further comprising:
  instructions to represent data of a second type related to at least one of a communication link to at least one of the first and second contact centers and a service area associated with at least one of the first and second contact centers.

12. The non-transitory computer readable medium of claim 11, further comprising:
  instructions to present information of a third type in response to user input selecting one of the first and second contact centers.

13. A device, comprising:
  a communication interface;
  a user output;
  a user input;
  a processor;
  memory, wherein the memory has stored thereon:
    first call center data;
    second call center data;
    a monitor and control application, wherein the monitor and control application is executed by the processor and displays call center related information to a user, wherein the call center related information is presented graphically by the user output, wherein the call center related information associated with a first call center is displayed on a map in a first geographic location corresponding to an actual location of the first call center, and wherein the call center related information associated with a second call center is simultaneously displayed on the map in a second geographic location corresponding to an actual location of the second call center, wherein
    a status of a first communication link between the first call center and at least one of the second call center and a second geographic region other than a first geographic region including the first call center is presented in the user output;
    information from a broadcast news feed associated with the geographic location of the first call center is presented in the user output while representing the geographic location of the first call center, the geographic location of the second call center, and the status of the first communication link is presented in the user output;
    a status of a second communication link between the second call center and at least one of the first call center and a third geographic region other than a fourth geographic region including the second call center is presented in the user output;
    information from a news feed associated with the geographic location of the second call center is presented in the user output,
    wherein assigned performance scores of the first and second call centers, the status of the first communication link between the first call center and at least one of the second call center and the second geographic region other than the first geographic region including the first call center, information from the broadcast news feed associated with the geographic location of the first call center, the status of the second communication link between the second call center and at least one of the first call center and the third geographic region other than the fourth geographic region including the second call center, and the information included in the news feed associated with the geographic location of the second call center are all displayed simultaneously in the user output.

14. The device of claim 13, further comprising:
a communication application stored in the memory, wherein the communication application supports communications between the device and one of the first and second call centers in response to a selection of a displayed depiction of the one of the first and second call centers.

15. The device of claim 13, wherein the monitor and control application additionally displays information related to at least one of: a status of a third communication link between one of the first and second call centers and another call center or service area, conditions in a geographic location of the another call center, and a status of a service area on the map.

* * * * *